United States Patent [19]
Hamblen et al.

[11] 3,849,657
[45] Nov. 19, 1974

[54] ELECTRO-OPTICAL DISPLAY DEVICE AND METHOD

[75] Inventors: David P. Hamblen; George C. Higgins, both of Rochester, N.Y.

[73] Assignee: Eastman Kodak Company, Rochester, N.Y.

[22] Filed: Jan. 9, 1973

[21] Appl. No.: 322,270

Related U.S. Application Data

[63] Continuation-in-part of Ser. No. 192,414, Oct. 26, 1971, abandoned.

[52] U.S. Cl. .............................................. 250/461
[51] Int. Cl. ............................................. G01t 1/16
[58] Field of Search ........... 250/361, 362, 363, 484, 250/458, 459, 460, 461; 315/169 TV; 350/160 R; 252/301.2 R; 313/92 PH, 108 A, 108 B

[56] References Cited
UNITED STATES PATENTS
| | | | |
|---|---|---|---|
| 3,322,485 | 5/1967 | Williams | 350/160 LC |
| 3,452,199 | 6/1969 | Stahlhut | 250/71 R |
| 3,539,941 | 11/1970 | Halverson | 252/301.2 R |

*Primary Examiner*—James W. Lawrence
*Assistant Examiner*—Davis L. Willis
*Attorney, Agent, or Firm*—Dennis M. DeLeo

[57] ABSTRACT

A display device and method are described which involve an element comprised of a cell containing an organic luminescent medium. This cell is subjected to ultraviolet radiation which causes fluorescence of the medium. The fluorescence can be quenched by applying an electric field across the medium.

20 Claims, 4 Drawing Figures

ELECTRO-OPTICAL DISPLAY DEVICE AND METHOD

BACKGROUND OF INVENTION

1. Field of Invention

This invention relates to the field of electro-optical elements and their use as image panels or optical display devices.

2. Description of the Prior Art

Williams U.S. Pat. No. 3,322,485 describes an electro-optical device which involves two parallel electrodes (at least one of which is transparent) having therebetween an organic thermotropic nematic compound. The application of an electric field between the two electrodes results in a change in the optical properties of the element. This change is believed to be caused by a reorientation of the molecules under the influence of the applied potential. The changed optical properties thus alter the light transmission or reflecting properties.

Devices of this type, while useful, basically involve the modulation of transmitted or reflected visible light and, therefore, are not suited for use where it is desired to view another image simultaneously by transillumination. Thus, there is a need for transparent electro-optical devices which allow for simultaneous viewing of additional images by transillumination.

SUMMARY OF THE INVENTION

We have found that the fluorescence of certain molecules can be quenched by the application of an electric field. The concept of quenching of fluorescence by chemical means, e.g., through the use of oxygen, iodine, etc, is old in the art. However, such means are unsatisfactory for purposes of this invention in that typically, there is no recovery (i.e., recurrence of fluorescence) from chemical quenching or at best only very slow recovery. For use in optical display devices, it is necessary that the recovery or return of fluorescence occur in essentially real time.

The present technique of quenching involves the application of an electrical field across an organic luminescent medium during exposure to activating radiation. The organic luminescent media useful in this invention include a variety of rare earth metal chelates which fluoresce upon exposure to ultraviolet radiation. This fluorescence can be selectively and repeatedly quenched by the application of an electric field.

Electro-optical elements utilizing this concept are simple and reliable devices having a very low power requirement. The response time of the present elements is rapid and the elements are non-scattering and transparent which allows for viewing additional images by transillumination.

DESCRIPTION OF PREFERRED EMBODIMENTS

The objects of the present invention are accomplished by the use of a transparent cell having two spaced, transparent conductive walls having therebetween a rare-earth metal chelate which fluoresces upon exposure to ultraviolet radiation. This fluorescence can be quenched at will by the application of an electric potential difference between the conductive walls.

Figure 1:
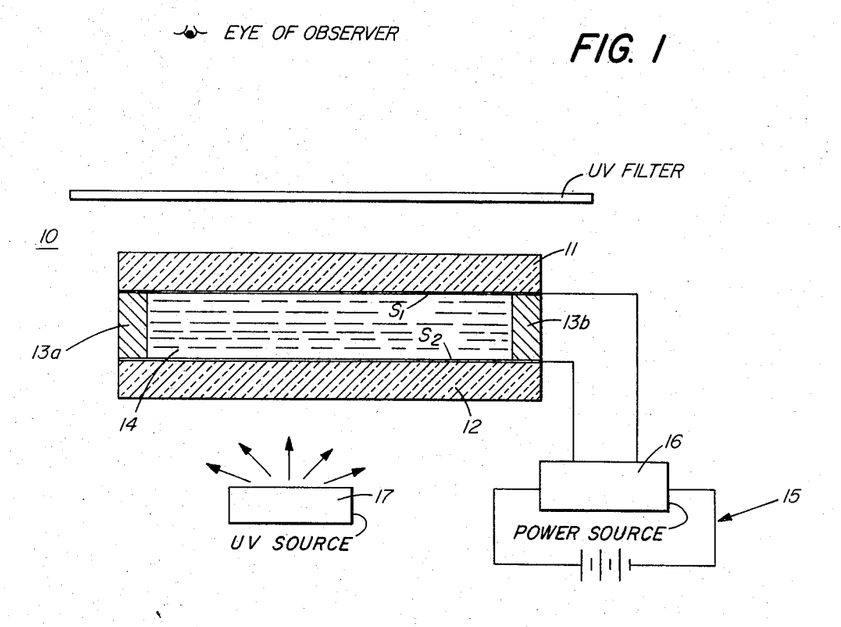
FIG. 1 is a schematic representation of an electro-optical element of the invention.

A typical arrangement of a device of this invention is shown in FIG. 1 wherein cell 10 is comprised of two transparent, conductive walls 11 and 12 which are spaced apart by insulating spacers 13a and 13b. Any relatively rigid transparent conductive material can be used as walls 11 and 12 such as conducting polymeric materials, conducting glasses, etc. Other useful materials include transparent supports having thereon a transparent conducting coating such as glass coated with indium oxide. Walls 11 and 12 are shown for convenience as formed of a transparent material having transparent conducting coatings $S_1$ and $S_2$, respectively. Contained between walls 11 and 12 is an organic luminescent medium 14 as described further below. The conducting walls 11 and 12 are connected to a power source 15 having a polarity reversing switch 16. Also, associated with the cell 10 is a source 17 of ultraviolet radiation including means for directing the radiation to medium 14 in cell 10. In order to avoid the possibility of ultraviolet radiation damage to the eyes of the observer, an ultraviolet filter is placed over cell 10. Although source 17 is shown on a side of cell 10 opposite the observer, similar results can be obtained with source 17 on the same side of cell 10 as the observer. The power of the ultraviolet source can vary widely with the brightness of luminescence varying directly as a function of the power. Ultraviolet sources having an output in the range of 5 to 150 watts are useful.

During operation, ultraviolet radiation is directed into cell 10 to cause medium 14 to fluoresce. By energizing source 15, the fluorescence at either wall 11 or 12 can be quenched depending upon the polarity. This quenching effect is believed to be the result of electron injection at the cathode. Thus, when $S_2$ is the cathode, fluorescence is quenched at wall 12 and the observer will see no coloration. By reversing the polarity to make $S_2$ the anode, fluorescence returns at wall 12 (with a corresponding quenching at wall 11). Similarly, if source 15 is turned off altogether, fluorescence will return.

Figure 2:
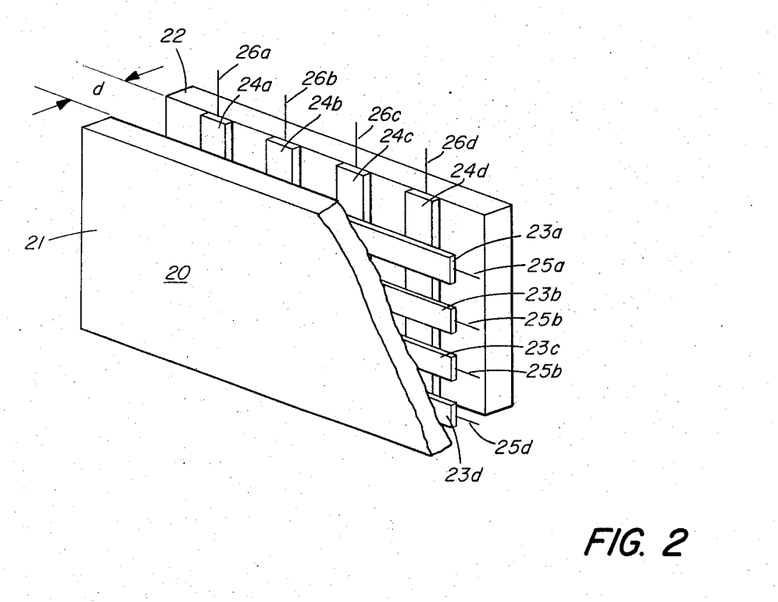
FIG. 2 is a schematic representation of an addressable cross-gridded cell arrangement.

A further aspect of the invention is illustrated in FIG. 2 which depicts an addressable cross-conductor grid cell 20 which has transparent walls 21 and 22 spaced apart distance $d$ (typically about 1 to about 50 microns) by spacers not shown. The inner faces of walls 21 and 22 carry conductive portions 23a, b, c and d and 24a, b, c and d, respectively. The conductive strips on wall 21 are arranged orthogonal to the conductive strips on wall 22 to form an x–y grid. Each of the conductive portions 23a, b, c and d and 24a, b, c and d have associated therewith electrical leads 25a, b, c and d and 26a, b, c and d, respectively. This arrangement enables one to address selected portions of the grid. Thus, if during exposure to the UV source, a potential difference is applied between conductive portion 23b and 24d, fluorescence is quenched only in the area of overlap of those two portions. By use of suitable logic, solid state electronic systems can be utilized to address a large scale panel of this type and display alphanumeric information in real time.

Figure 3:
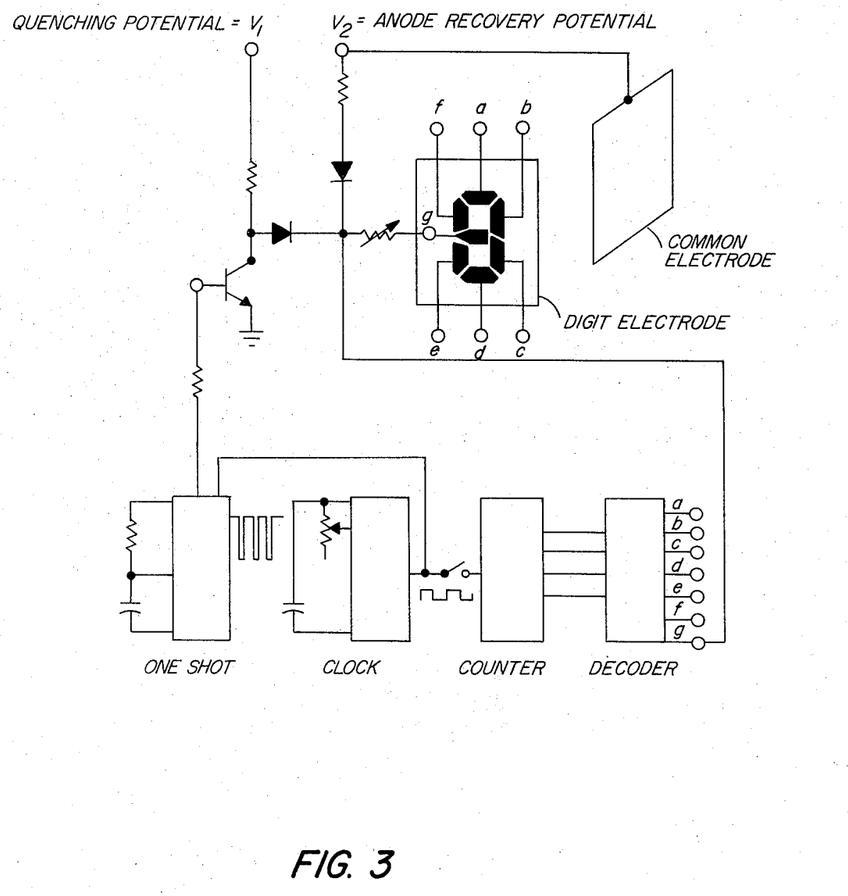
FIG. 3 is a schematic representation of a device for numerical displays.

An additional aspect of the invention is depicted in FIG. 3. As in FIGS. 1 and 2, a cell is formed by two spaced, transparent conductive walls. For convenience, the walls are shown out of position in order to clearly illustrate the configuration of the conductive portions on the digit electrode which forms one wall of the cell. The other wall is designated as the common electrode. This embodiment is useful for displaying numeric information. The illustrated circuitry is designed for sequentially addressing the cell to display numbers 0 through 9 and repeat.

Figure 4:
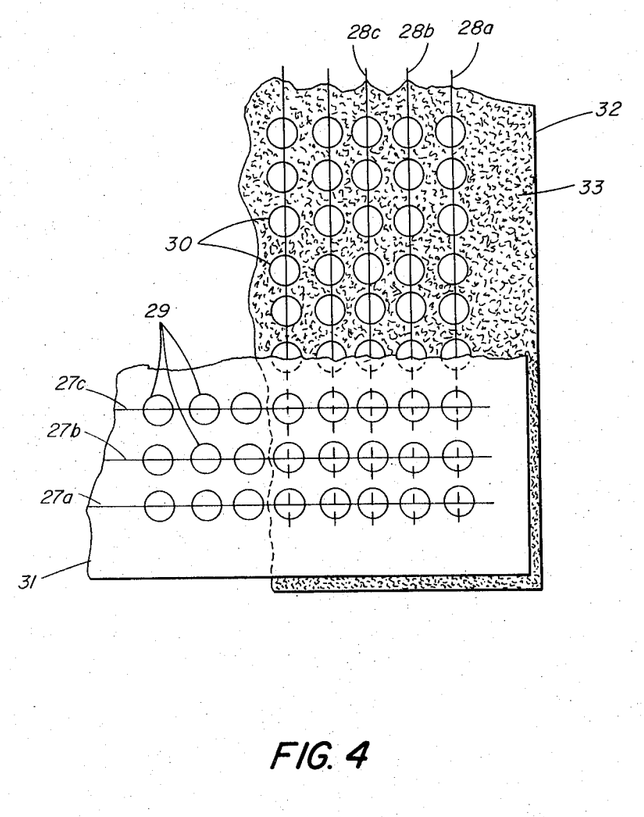
FIG. 4 is a schematic representation of another addressable cross-gridded cell arrangement.

FIG. 4 shows a further embodiment of the invention where the relatively high resistance thin film conductors 23a–d and 24a–d of FIG. 2 have been replaced by low resistance wires 27a, b, c and 28a, b, c, etc, which join transparent indium oxide electrodes 29 and 30, respectively in the form of conductive areas in the shape of discs on each of the glass cell walls 31 and 32. Also on the U.V. illuminated cell wall 30 is a photoresist layer 33 deposited around electrodes 30. Layer 33 contains an ultraviolet absorbing material such as a dye. Layer 33 thus serves to prevent fluorescence across the complete screen but allowing fluorescence only in the areas between electrodes of walls 31 and 32. Layer 33 serves as the appropriate spacing means for walls 31 and 32 as well as serves to compartmentalize and thereby restrict the fluorescent medium (not shown) to the active areas which prevents crosstalk or undesired quenching of adjacent, unaddressed electrodes. For transillumination, it is necessary that both walls 31 and 32, be transparent. The word transparent as used herein means capable of transmitting light in the visible range as well as ultraviolet and near infrared radiation unless otherwise limited. However, if the present device is not to be viewed through, but only used to display information, then only the wall facing the viewer and the UV source need be transparent.

In accordance with this invention, the various cell configurations contain an organic luminescent medium. This medium is comprised of a solution of a rare earth metal chelate which fluoresces upon exposure to ultraviolet radiation. Preferred materials are rare earth metal β-diketone chelates (including salts thereof). Useful chelates can be represented by the formula M(Lig)$_3$ wherein M represents a metal of the rare earth series such as those elements having an atomic number of 57–71 and 89–103 inclusive (i.e., the lanthanides and the actimides) and Lig represents a β-diketone ligand moiety which can broadly be referred to as a 1,3-dioxocarbonyl moiety. The ligand moieties can be alike or different and they are all linked in chelate form to the rare earth metal. Additional useful chelates can be represented by the formula $Q^{n+}[^{M(Lig)}4^{116}]_n$ wherein $Q^{n+}$ represents a cation of valence $n$ where $n$ is an integer from 1 to 6, preferably 1 to 3 and M and L$ig$ are as defined above. These latter materials are described further in U.S. Pat. No. 3,254,103, issued May 31, 1966.

More detailed structural representations of useful chelates are as follows:

wherein $Q^{n+}$, $n$ and M have their previously described meanings and R, R', and R'', which can be alike or different, are monovalent hydrocarbon radicals, e.g., alkyl, aryl, alkaryl, aralkyl, cycloalkyl, halohydrocarbon (preferably fluorocarbon) or heterocyclic radicals generally of no more than 10–12 carbons each and free of aliphatic unsaturation; R' can also be chlorine, bromine, iodine or cyano.

The groups R, R' and R'' can also be substituted with non-interfering functional substituents such as one or more halogens of atomic number from 9–53, inclusive; one or more hydrocarbon substituents of the types just defined; one or more hydrocarbyl ether or thioether substituents wherein the hydrocarbon moiety is as just defined; one or more hydrocarbyloxy-carbonyl, i.e., carboxyester, substituent or mono- or dihydrocarbylaminocarbonyl, i.e., carboxamido, substituents wherein in all three types the hydrocarbyl substituents are as just defined; one or more hydrocarbylcarbonyl or thiocarbonyl substituents wherein the hydrocarbyl radicals are as just defined; and the like.

The cation portion of the useful trivalent octacoordinate rare earth metal chelates can be any of the well known cations including those of the elements of Group IA, IIA, etc, of the Periodic Table, e.g., Li+, Na+, K+, Rb+, Cs+, Be+$^2$, Mg+$^2$, Ca+$^2$, Sr+$^2$, Ba+$^2$, as well as ammonium (NH$_4$+) and substituted aminium and ammonium radicals from any mono- or polyamine of the general formulas:

where the R'''s, alike or different, are any hydrocarbon or substituted hydrocarbon radicals such as alkyl, aryl, cyclo-alkyl, aralkyl, and alkaryl monovalent hydrocarbon radicals, generally of no more than 14 carbons each. In the di-, tri-, and tetrasubstituted ammonium cations, any two or more of the R'''s can be joined together to form with the said ammonium nitrogen a mono- or polycyclic nitrogen heterocycle. In those instances where two or more of the R'''s are joined together, they can be joined through oxygen, nitrogen, or sulfur-interrupted bridges to form with the said ammonium nitrogen, respectively, mono- or polycyclic oxaaza, diaza, and azathia heterocycles. The various R''' groups can also be substituted with non-interfering functional substituents as described above for R, R' and R''.

The rare earth metal unit in the useful chelates can be any one of the rare earth metals which are normally regarded as being members of the lanthanide or actinide series and are expressly inclusive of the transition rare earth metals running from atomic numbers 57–71 and 89–103, such as lanthanium, cerium, praseodymium, neodymium, promethium, samarium, europium, gadolinium, terbium, dysprosium, holmium, erbium, thulium, ytterbium, letitium, actinium, thorium, protactinium, uranium, neptunium, plutonium, americium, berkelium, californium, einsteinium, fermium, dendelevium, nobelium, and lawrencium. Especially preferred rare earth metals include europium and terbium.

The ligand moieties of the useful rare earth metal chelates can also vary widely and include compounds of the basic structure;

wherein the R, R' and R'' radicals have their previously defined meanings. Suitable classes of useful ligands include dialkyl β-diketones, e.g.,
pentane-2,4-dione,
hexane-2,4-dione,
heptane-2,4-dione,
heptane-3,5-dione,
nonadecane-9,11-dione,
9-methyloctadecane-8,10-dione,
tricosane-11,13-dione,
1,1,1,5,5,5-hexafluoropentane-2,4-dione,
1,1,1-trifluoropentane-2,4-dione,
1,1,1,19, 19, 19-hexafluorononadecane-9,11-dione;
alkylaryl β -diketones, e.g.,
1-phenylbutane-1,3-dione,
1-phenyl-4,4,4-trifluorobutane-1,3-dione,
1-phenylundecane-1,3-dione,
1-(3,4-dimethylphenyl)-2-methyltridecane-1,3-dione,
1-(4-methoxyphenyl)-4,4,4-trifluorobutane-1,3-dione,
1-(2-thienyl)-4,4,4-trifluorobutane-1,3-dione,
1-(4-nitrophenyl)-4,4,4-trifluorobutane-1,3-dione,
1-(3-nitrophenyl)-4,4,4-trifluorobutane-1,3-dione,
1-phenyl-2-trifluoromethyl-4,4,4-trifluorobutane-1,3-dione;
and diaryl β -diketones, e.g.,
1,3-diphenylpropane-1,3-dione,
1,3-(2,4-dimethylphenyl)propane-1,3-dione,
1-phenyl-3-(2-pyridyl)propane-1,3-dione,
1,3-di(4-pyridyl)propane-1,3-dione,
1-(4-methoxy)-3-(4-nitrophenyl)propane-1,3-dione,
1,3-di(4-nitrophenyl)propane-1,3-dione,
1,3-didurylpropane-1,3-dione,
1-furylbutane-1,3-dione,
1-thienylbutane-1,3-dione,
1-furyl-3-phenylpropane-1,3-dione,
1-furyl-3-thienylpropane-1,3-dione,
1,3-difurylpropane-1,3-dione,
1,3-dithienylpropane-1,3-dione, and
3-methylpentane-2,4-dione.

The size of the particular ligand(s) used has an effect on the efficiency of the system. The ligand moieties absorb the ultraviolet radiation and transmit the energy to the rare earth metal which fluoresces. Thus, larger ligands can increase the efficiency by absorbing more UV radiation. Also, as the ligand determines the absorption maximum of the system, various chelates can be tailor-made to absorb at various wavelengths.

The solvents useful in forming solutions of the above chelates include a wide variety of conductive solvents as well as many dielectric solvents which contain a conductivity agent. Suitable solvent systems have a volume resistivity which typically is below about $1 \times 10^5$ ohm—cm. Useful solvents include organic liquids inert to the chelate such as alkanols, e.g., methanol, ethanol, etc; halogenated hydrocarbons, e.g., dichloromethane, dichloroethane; aromatic hydrocarbons, such as benzene and substituted benzene; cyclic ketones such as tetrahydrofuran, etc; alkyl formamides such as dimethylformamide, etc; cyclic dioxides, e.g., p-dioxane, etc; methyl sulfoxide; acetonitrile; bis(2-methoxyethyl)ether; pyridine and other liquids. The various solvents can be used alone or in combination.

While many solvents are sufficiently conductive by themselves, others are more suitable when used in combination with a conductivity agent. Useful additives for this purpose include a variety of ionic salts which function as current carriers. Particularly useful salts are organic salts including a variety of non-interfering onium compounds. Representative of such compounds having an organic cation are various ammonium and imonium compounds, e.g., benzyltrimethyl ammonium iodide, tetrabutylammonium iodide, tetrabutylammonium perchlorate, tetrapentylammonium chloride, etc; carbonium compounds, e.g., tritylium perchlorate, etc; oxonium compounds, e.g., methoxypyrylium perchlorate; sulfonium and thionium compounds, e.g., trimethylsulfonium iodide, etc; and similar compounds as well as mixtures thereof.

Typically, the concentration of the conductivity agent is in the range of 0 to about 1.5 molar depending upon the solvent used. Preferably, the solvent system is sufficiently conductive so as to have a volume resistivity of less than about $1.5 \times 10^4$ ohm—cm. The concentration of the rare earth metal chelate in the solution can vary from about ½ to about 2 molar and has very little effect on the conductivity. However, as the chelate concentration is decreased, the response time generally decreases.

As mentioned previously, the spacing of the cell walls can vary. The electrical potential applied across the luminescent medium typically will vary with the wall spacing. The minimum voltage necessary is dependent not only upon spacing but also upon any impurities present. The theoretical minimum value necessary for any given system is equal to the redox potential of the chelate used. However, the actual potential required may be greater than the theoretical value. In any instance, the actual potential required can be readily determined. Useful results can be obtained when the spacing and applied potential produce an electric field having an intensity of about 300 to about 700 volts/cm.

The following examples are included for a further understanding of the invention.

EXAMPLE 1

An 85 mg. portion of chelate 1, tris[4,4,4-trifluoro-1-(2-thienyl)-1,3-butane-diono]europium, is dissolved in 0.1 ml. of dimethylformamide (DMF). This composition forms a 1 molar stock solution from which an aliquot is fed by capillary flow into a cell as shown in FIG. 1 comprising two strips of glass coated with a transparent conductive coating of indium oxide and having contact leads. The glass plates are spaced 0.002 inches apart by dielectric spacers placed around the edge thereof to form a void for accomodating the active luminescent medium. The complete cell assembly is held together by metal clamps. After feeding the active medium into the cavity, the cell is illuminated by a UV source with an output of 360 nm. The characteristic red fluorescence (612 nm) of the chelate is viewed on the opposite side of the cell from which the UV light is incident. When 2.8 volts is applied across the cell, quenching of the fluorescence is observed at the cathode conductor. Reversal of polarity results in the return of the fluorescence. Removal of the electric field altogether caused the dye fluorescence to remain. It is found that this cycling of the electric field can be repeated without appreciable degradation of the chelate solution.

EXAMPLE 2

Example 1 is repeated using chelate 2, tris[4,4,4-trifluoro -1-(2-furyl)-1,3-butanediono]europium, in place of the chelate 1. The resultant composition emits at a wavelength maximum of about 612 nm.

EXAMPLE 3

Example 1 is repeated using as the chelate compound No. 3, tris(1-phenyl-1,3-butanediono)europium, in a solvent of tetrahydrofuran. The resultant composition emits at a wavelength maximum of about 612 nm.

EXAMPLE 4

The procedure of Example 1 is again repeated only using chelate 4, tris(1-phenyl-1,3-butanediono)terbium, in a dichloroethane solvent. The resultant composition emits at a wavelength maximum of about 540 nm.

EXAMPLE 5

The general procedure of Example 1 is again repeated using chelate 5, tris(1-phenyl-1,3-butanediono)samarium, as the active compound together with dichloroethane as the solvent. The resultant composition emits at a wavelength maximum of about 600 nm.

For a typical addressable cell area of about 1 cm$^2$, the response time to quenching is a millisecond or less with an applied voltage pulse 1 millisecond long and 1.5 to 2.8 d.c. volts. Recovery times are in the order of about 10 to about 20 milliseconds. For some applications, it may be desirable to extend the period of time that the emitted light from the chelate is quenched after the electrical field is removed. Certain viscous material such as silicone oil, cholesteryl oleyl carbonate, sucrose solutions and other materials can be added for this purpose. It appears as if these viscous liquids reduce the diffusion rate of the dissolved chelate molecules through the solution. Once the molecule has been reduced by picking up a charge from a cathode electrode (which results in quenching), it must give up this charge in order to recover from the quenched state. If during the quenching time, the molecule has migrated away from the vicinity of the cathode, then the longer it will take for recovery to occur after the current is removed. This viscosity effect is further exemplified by Examples 6 through 12 as follows.

EXAMPLE 6

To 850 mg. of chelate No. 1 and 10 ml. of dimethylformamide, a 50 percent by weight solution of cholesteryl oleyl carbonate in DMF is added. The resultant combination is placed in a cell as described in Example 1 and exposed to UV followed by application of an electrical potential as previously described. Quenching occurs in about 10 milliseconds and it takes about 10 seconds for fluorescence to recur after the electric field is removed. When the voltage is reversed, however, the fluorescence is completely recovered at the same voltage in about ½ second.

EXAMPLE 7

Example 6 is repeated using as the viscous liquid silicone oil. The results are essentially the same as those in Example 6, except that the times are increased by a factor of about 20 percent.

EXAMPLE 8

Example 6 is again repeated, except that the viscous liquid used is a 50 percent by weight solution of sucrose in DMF. The results of this experiment are similar to those obtained in Example 6.

EXAMPLES 9 THROUGH 12

Chelates 2, 3, 4 and 5 are treated as in Example 6 with similar results being obtained.

Two compounds which fluoresce under UV excitation can be put in the same cell to form an element capable of providing a multicolor display. This is accomplished by utilizing a quenching chelate of the type described herein together with a non-quenching fluorescing dye. In this manner, one of the components can be quenched to provide only the coloration of the non-quenching dye. During reversal or removal of the electric field, both dyes would fluoresce, thus giving rise to the second color. This embodiment is further described in the following Examples 13 through 15.

EXAMPLE 13

To a 2 molar solution of chelate 1 and dimethylformamide sufficient mono-bromofluorescein sodium salt is added to obtain a 1 molar solution of the salt. Ultraviolet excitation causes a pink color to be emitted from a display cell of the type described in Example 1 carrying the above solution. When the illuminated sample is placed in a 600 volt/cm field, the pink color changes to blue-purple indicating that the chelate emission is quenched, but the dye salt emission is not. When the electric field is removed, the pink color returns to the cell.

EXAMPLE 14

Example 13 is repeated except that the non-quenching dye used is 1,4-bis(2,4-dianilino)-sym.-triazinoaminostilbene. When the cell containing this composition is subjected to UV excitation, it emits a red-colored light. When the cell is placed in an electric field, coupled with UV excitation, the emitted light is blue with a peak emission at about 490 nm.

EXAMPLE 15

Example 13 is repeated again, except that the non-quenching dye used is Eosine. The emitted light resulting from UV excitation is red in color and when the electric field is applied, the emission is orange-yellow in color with a peak of about 580 nm.

As mentioned previously, a cross conductor grid cell can be utilized to allow one to selectively address various portions of the cell. This embodiment of the invention is further illustrated in the following example.

EXAMPLE 16

A cross conductor grid cell is constructed from Nesatron plates (manufactured by PPG Co.) by etching away strips of conducting coating on a glass substrate and leaving lines of conductor at a spacing of about 20 lines to the inch. Two planar transparent plates are thus prepared and positioned in a configuration similar to that shown in FIG. 2 so that the conductive strips of one transparent wall of the cell are orthogonal to the strips of the opposite wall thereby comprising an $x$–$y$ grid. The spacing between the cell walls is about 50 microns. A luminescent medium comprising a 2 molar concentration of tris-[4,4,4-trifluoro-1-(2-thienyl)-1,3-butanediono]europium in N,N-dimethylformamide is fed into the cell cavity by capillary flow. The edges around the spaces between the cell walls are sealed from the atmosphere by wax, epoxy or silicon rubber. Electrical connections are then formed to each set of strip electrodes by insulated wires through low ohmic contact with silver pain followed by an epoxy overlayer for mechanical strength. The terminal ends of the wire lead-ins are connected to a function generator which allows each wire to be individually addressed, or in pairs, or all simultaneously by an electrical pulse of no greater than 3 volts. This cell is then illuminated with a 14 watt mercury lamp source with a peak output of 360 nm. Red fluorescence of the active medium is observed on the surface opposite that of the illuminating source. Red fluorescence is also observed when the cell is illuminated by UV radiation on the same side as that of the observer. Without the application of an electric field, the full panel fluoresces red across its entirety. When a voltage pulse is applied between one conductive strip on one plate and an opposing strip on another plate, a small portion or square is caused to quench its fluorescence and appear dark. In a like manner, two opposing strips can be energized to cause four squares to quench, i.e., a square composed of two by two addressed conductors on each plate. In a like manner, various patterns are constructed by energizing combinations of conductive strips. Once the electric field is removed or reversed in polarity, the addressable areas are observed to return within a few milliseconds to their natural fluorescent state. By means of selective logic, solid state electronic systems can be utilized to address such a panel and display alphanumeric information in real time.

Of the several display panels described above, it is found that quenching and refluorescence can be maintained for hours without noticeable degradation in fluorescence. Likewise, the brilliant fluorescence gives sufficient brightness to allow the display panel to be of practical viewing in a normally light environment. Contrast is also observed to be acceptable under these conditions.

As also mentioned above, organic salts can be added to the solvent system as charge carriers in order to enhance or facilitate quenching. An example of this embodiment follows.

EXAMPLE 17

A 1 molar solution of chelate 1 is prepared using p-dioxane as the solvent. This material, when used to fill a cell of the type described in Example 1 and subjected to UV radiation, gives rise to visible fluorescence. However, when a potential is applied as in Example 1, no quenching results. However, when the same chelate solution has added thereto a few milligrams per milliliter of tetra-n-butylammonium perchlorate, quenching does result upon application of an electric field.

EXAMPLE 18

In a manner similar to that for fabricating the cross conductor grid of Example 16, a pattern for displaying numerals 0 through 9 is etched onto a Nesatron plate in the configuration shown in FIG. 3. In this standard design, the conductors comprise seven bars arranged in a figure eight with conducting elements leading to each bar, the electrical connections being made from outside the cell. The complete envelope is composed of a common electrode of Nesatron (the anode), which is positioned by 1 micron thick spacers from the Nesatron plate etched with the configuration above. All but the 7-bsr electrodes in the center of the cell are covered by photoresist, thus insulating the electrical lead-ins from the anodes. By dissolving an ultraviolet absorptive dye in the photoresist, only the exposed areas at the 7-bars become fluorescent when the cell is filled with the active medium comprised of chelate 1 and dimethylformamide and subjected to UV radiation. Through the logic system shown in FIG. 3, the 7-bars are addressed sequentially to display the numbers 0 through 9 and repeat this sequence. The logic system is designated to cause quenching on those bars not comprising the digit desired so that the numerals themselves each appear as red fluorescent numbers. The above-described device can also be used in connection with another separate display image which is viewed through the electro-optical cell. In this arrangement, a slide projector is used to rear project an image onto a frosted plastic rear projection screen. The light source of the projector is attenuated by a neutral density filter. The dye cell is placed close to the screen on the side opposite the projector. The dye cell is illuminated with a 100 watt ultraviolet source located on the same side as the observer. Red fluorescent numbers appear superimposed on the projected images. Good results are obtained with the projection of black and white or color images.

EXAMPLE 19

Example 1 is repeated using as the chelate triethylammonium tetrakis [4,4,4-trifluoro-1-(2-thienyl)butane-1,3-diono]-europium (III). The resultant DMF solution of this chelate fluoresces orange when illuminated with ultraviolet light. Upon application of a potential to a cell containing this chelate as in Example 1, the fluorescence is rapidly quenched.

EXAMPLE 20

Example 19 is repeated using p-dioxane as the solvent in place of DMF. In addition, tetra-n-butylammonium perchlorate is added as in Example 17. Again, the solution fluoresces orange and the fluorescence is quenched upon application of a potential as described above. In this solvent system, the response is slower than the response seen in Example 19.

The invention has been described in detail with particular reference to certain preferred embodiments thereof, but it will be understood that variations and modifications can be effected within the spirit and scope of the invention.

We claim:

1. An electro-optical display device comprising:
   a. a transparent cell having two spaced transparent conductive walls, said cell containing an organic luminescent medium which fluoresces upon exposure to ultraviolet radiation,
   b. a source of ultraviolet radiation,
   c. means for directing said radiation to said cell to excite said medium contained therein to cause fluorescence of said medium at one conducting wall of said cell, and
   d. means for applying an electrical potential between said walls to quench fluorescence at said wall.

2. A device as described in claim 1 wherein said means for applying an electrical potential includes means to reverse the polarity of or terminate said potential.

3. An electro-optical display device comprising:
   a. a transparent cell having two spaced, transparent conductive walls, said cell containing an organic luminescent medium comprised of a rare earth metal β-diketone chelate which medium fluoresces upon exposure to ultraviolet radiation,
   b. a source of ultraviolet radiation,
   c. means for directing said radiation to said cell thereby causing fluorescence of said medium at one conductive wall of said cell, and
   d. means for applying an electric potential between said walls to quench fluorescence at said wall.

4. A device as described in claim 3 wherein said chelate has the formula:

or wherein M represents a rare earth metal of atomic number 57–71 and 89–103 inclusive, Lig represents a β-diketone ligand moiety and $Q^{n+}$ represents a cation of valence $n$ where $n$ is an integer from 1 to 6 inclusive.

5. A device as described in claim 3 wherein said chelate has the structure:

wherein M represents a rare earth metal of atomic number 57–71 and 89–103 inclusive, R and R″ each represent a member selected from the group consisting of a monovalent hydrocarbon radical and a monovalent heterocyclic radical of no more than 12 carbon atoms and free of aliphatic unsaturation, and R′ represents a member selected from the group consisting of a monovalent hydrocarbon radical and monovalent heterocyclic radical having no more than 10 carbon atoms and free of aliphatic unsaturation, a halogen atom and a cyano radical.

6. A device as described in claim 3 wherein said chelate has the structure:

wherein:

$Q^{n+}$ represents a cation of valence $n$ where $n$ is an integer from 1 to 6, inclusive, M represents a rare earth metal of atomic number 57–71 and 89–103, inclusive, R and R″ each represent a member selected from the group consisting of a monovalent hydrocarbon radical and a monovalent heterocyclic radical of no more than 12 carbon atoms and free of aliphatic unsaturation, and R′ represents a member selected from the group consisting of a monovalent hydrocarbon radical and monovalent heterocyclic radical having no more than 10 carbon atoms and free of aliphatic unsaturation, a halogen atom and a cyano radical.

7. A device as described in claim 3 wherein said rare earth metal β-diketone chelate is a europium β-diketone chelate.

8. A device as described in claim 3 wherein said rare earth metal β-diketone chelate is a terbium β-diketone chelate.

9. A device as described in claim 3 wherein said rare earth metal β-diketone chelate is a samarium β-diketone chelate.

10. A device as described in claim 3 wherein said rare earth metal β-diketone chelate is selected from the group consisting of tris[4,4,4-trifluoro-1-(2-thienyl)-

1,3-butane-diono]europium, tris[4,4,4-trifluoro-1-(2-furyl)-1,3-butanedione]-europium, tris(1-phenyl-1,3-butanediono)europium, tris(1-phenyl-1,3-butanediono)terbium, tris(1-phenyl-1,3-butanediono)samarium, and triethylammonium tetrakis[4,4,4-trifluoro-1-(2-thienyl)butane-1,3-diono]europium (III).

11. A method of displaying information comprising the steps of exposing to ultraviolet radiation an organic luminescent medium which fluoresces upon exposure to said radiation and applying an electrical field across selected portions of said medium to quench fluorescence in the areas of the applied field.

12. The method as described in claim 11 including the additional step of reversing the polarity or termination of the applied potential.

13. A method of displaying information comprising the steps of exposing to ultraviolet radiation an organic luminescent medium comprising a rare earth metal β-diketone chelate which fluoresces upon exposure to said radiation and selectively applying an electric field to said medium to quench fluorescence in the areas of the applied field.

14. The method as described in claim 13 wherein said chelate has the formula:

or wherein M represents a rare earth metal of atomic number 57–71 and 89–103 inclusive, Lig represents a β-diketone ligand moiety and $Q^{n+}$ represents a cation of valence $n$ where $n$ is an integer from 1 to 6 inclusive.

15. The method as described in claim 13 wherein said chelate has the structure:

wherein M represents a rare earth metal of atomic number 57–71 and 89–103, inclusive, R and R'' each represent a member selected from the group consisting of a monovalent hydrocarbon radical and a monovalent heterocyclic radical of no more than 12 carbon atoms and free of aliphatic unsaturation, and R' represents a member selected from the group consisting of a monovalent hydrocarbon radical and a monovalent heterocyclic radical having no more than 10 carbon atoms and free of aliphatic unsaturation, a halogen atom and a cyano radical.

16. The method as described in claim 13 wherein the organic luminescent medium contains a chelate having the structure:

wherein:
$Q^{n+}$ represents a cation of valence $n$ where $n$ is an integer from 1 to 6, inclusive,
M represents a rare earth metal of atomic number 57–71 and 89–103, inclusive,
R and R'' each represent a member selected from the group consisting of a monovalent hydrocarbon radical and a monovalent heterocyclic radical of no more than 12 carbon atoms and free of aliphatic unsaturation, and
R' represents a member selected from the group consisting of a monovalent hydrocarbon radical and monovalent heterocyclic radical having no more than 10 carbon atoms and free of aliphatic unsaturation, a halogen atom and a cyano radical.

17. The method as described in claim 13 wherein said chelate is present in said medium in a concentration of from about ½ to about 2 molar.

18. A method of quenching fluorescence of an organic luminescent medium comprising a solution of a rare earth metal β-diketone chelate said method comprising applying to said medium an electric potential having a value of at least as great as the redox potential of said chelate.

19. An electro-optical display device comprising a cell having two spaced walls at least one of which is transparent;
an array of transparent electrically conductive areas on adjacent faces of said walls, each conductive area of one wall being superposed with a conductive area of the other wall to define a plurality of opposing electrode pairs;
spacer means between said walls comprising a transparent layer of an electrically insulating ultraviolet light-absorbing material, said layer defining apertures corresponding with said conductive areas;
an organic luminescent medium disposed in said apertures, said medium comprising a rare earth metal β-diketone chelate which fluoresces upon exposure to ultraviolet radiation;
means for directing ultraviolet light into said apertures to cause fluoroscence of said medium; and
means for establishing an electrical field between preselected electrode pairs to quench said fluorescence.

20. A device as described in claim 19 wherein said medium is a samarium or terbium β-diketone chelate.

* * * * *

UNITED STATES PATENT OFFICE
CERTIFICATE OF CORRECTION

Patent No. 3,849,657      Dated November 19, 1974

Inventor(s) David P. Hamblen and George C. Higgins

It is certified that error appears in the above-identified patent and that said Letters Patent are hereby corrected as shown below:

Col. 4, line 15, between the word "be" and the word "chlorine", insert --hydrogen,--;

Col. 12, line 23, after the comma, insert --a hydrogen atom,--

Col. 12, line 56, after the comma, insert --a hydrogen atom,--

Col. 13, line 58, after the comma, insert --a hydrogen atom,--

Col. 14, line 28, after the comma, insert --a hydrogen atom,--

Signed and sealed this 15th day of April 1975.

(SEAL)
Attest:

RUTH C. MASON
Attesting Officer

C. MARSHALL DANN
Commissioner of Patents
and Trademarks